(12) United States Patent
Christie

(10) Patent No.: US 10,524,577 B2
(45) Date of Patent: Jan. 7, 2020

(54) DETACHABLE SWIVEL SEAT

(71) Applicant: Friend Success, Inc., Corinth, TX (US)

(72) Inventor: Jeffrey Christie, Garland, TX (US)

(73) Assignee: Friend Success, Inc., Corinth, TX (US)

( * ) Notice: Subject to any disclaimer, the term of this patent is extended or adjusted under 35 U.S.C. 154(b) by 154 days.

(21) Appl. No.: 15/882,265

(22) Filed: Jan. 29, 2018

(65) Prior Publication Data

US 2019/0231076 A1 Aug. 1, 2019

(51) Int. Cl.
*A47C 5/10* (2006.01)
*A47C 3/18* (2006.01)
*A01M 31/02* (2006.01)
*A47C 1/00* (2006.01)

(52) U.S. Cl.
CPC ............. *A47C 5/10* (2013.01); *A01M 31/02* (2013.01); *A47C 1/00* (2013.01); *A47C 3/18* (2013.01)

(58) Field of Classification Search
CPC .... A47C 5/10; A47C 5/04; A47C 1/00; A47C 3/18; A01M 31/02
USPC .................................. 297/311; 182/124, 126
See application file for complete search history.

(56) References Cited

U.S. PATENT DOCUMENTS

| | | | | |
|---|---|---|---|---|
| 4,819,763 A * | 4/1989 | Grote | ..................... | A01M 31/02 108/152 |
| 5,927,437 A * | 7/1999 | Fast | ...................... | A01M 31/02 182/187 |
| 6,367,585 B1 * | 4/2002 | Fast | ...................... | A01M 31/02 182/135 |
| 8,522,920 B1 * | 9/2013 | Salyer | .................. | A01M 31/02 182/187 |
| 8,556,036 B1 * | 10/2013 | Meredith | .............. | A01M 31/02 182/113 |
| 2007/0114096 A1 * | 5/2007 | Skipper | ................. | A01M 31/02 182/116 |
| 2008/0163534 A1 * | 7/2008 | Lombardi | ........... | A01M 31/025 42/94 |
| 2008/0169156 A1 * | 7/2008 | Leishman | ............ | A01M 31/02 182/187 |
| 2014/0131137 A1 * | 5/2014 | Bassett | ................. | A01M 31/02 182/116 |
| 2015/0053503 A1 * | 2/2015 | Richey | .................. | A01M 31/02 182/187 |

(Continued)

*Primary Examiner* — Mark R Wendell

(57) ABSTRACT

A detachable seat includes an elongate support bar having first and second brackets with opposed open sides to receive an rigid elongate member in the brackets from opposite directions, a seat support frame including a first support member extending parallel to the support bar and a second support member affixed to the first support member, a hinge connecting the first elongate support member to the support bar, a seat mounted on the second support member, the seat support frame pivoting around the elongate support on the hinge and a retaining arm affixed to and extending from the elongate support bar adjacent the first bracket including a plurality of alignment apertures, the second support member having a mating aperture formed therethough, the mating aperture aligning with a plurality of the alignment apertures upon pivotal movement of the second support member around the hinge to receive a locking pin through the mating aperture and one of the alignment apertures to secure the seat in a selected pivotal position.

13 Claims, 9 Drawing Sheets

(56) References Cited

U.S. PATENT DOCUMENTS

2015/0230612 A1\* 8/2015 Weber, Jr. .............. A47C 4/021
297/130

\* cited by examiner

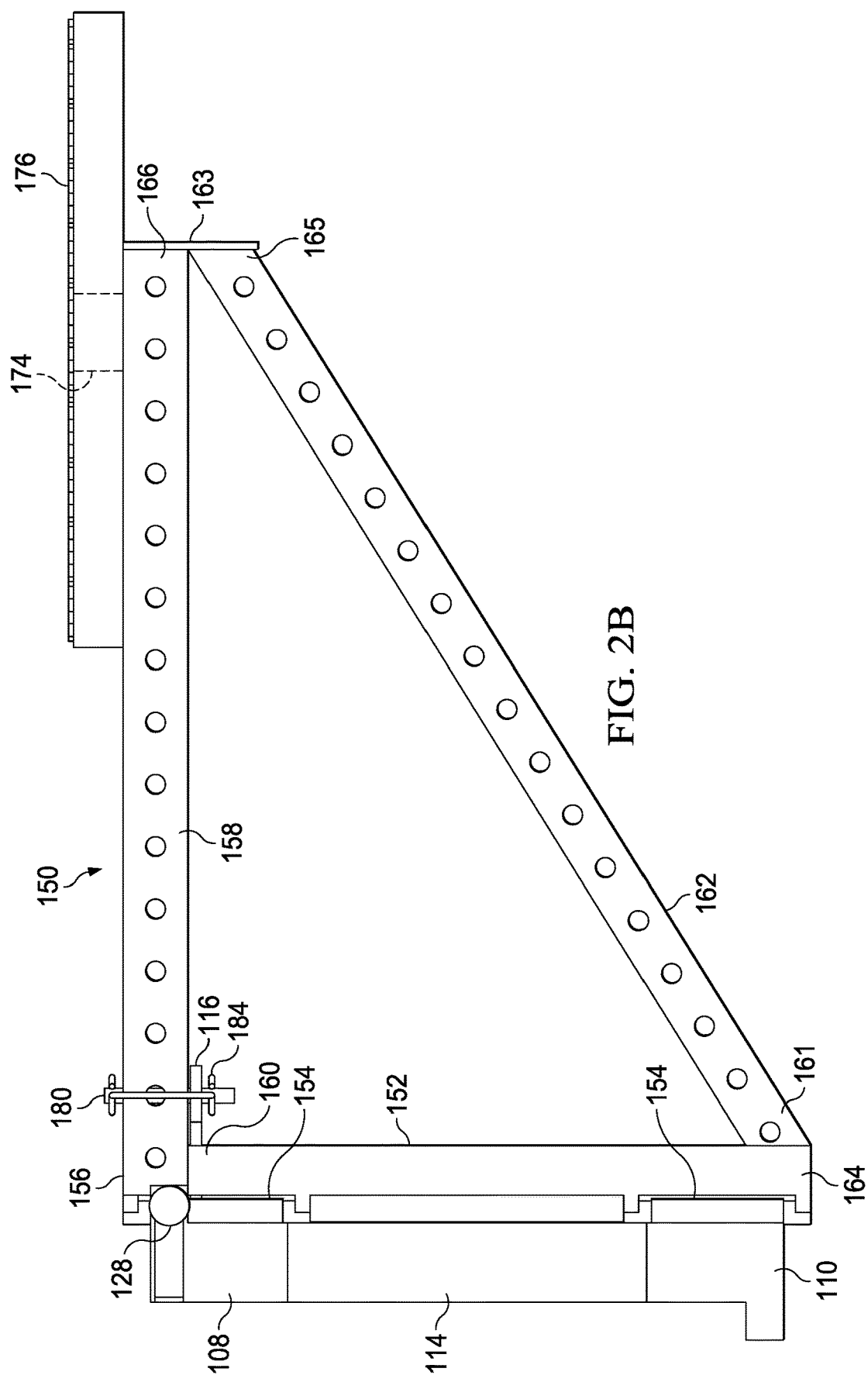

US 10,524,577 B2

DETACHABLE SWIVEL SEAT

TECHNICAL FIELD

A detachable seat is configured to be attached to the leg of a ladder or similar rigid member and swivel around the rigid member.

BACKGROUND

It is often desirable or necessary to be positioned at an elevated location for periods of time; for example, when working or hunting from an elevated location. In order to be comfortable and to function effectively for relatively long periods of time, it may be preferable to be in a seated position. However, it may also be necessary or desirable to be able to turn or pivot while sitting in an elevated location. For example, when hunting from an elevated position, one may wish to turn bodily to position himself to view different areas. It is also desirable that any seat or similar support be portable, and configured for attachment to a rigid support at multiple locations. Thus, there exists a need for a seat that is readily attachable to a rigid upright member, such as the leg of a ladder that allows a seated individual to turn without dismounting the seat.

SUMMARY

A detachable swivel seat configured for use at an elevated position includes an elongate support bar having first and second generally rectangular brackets positioned adjacent opposing ends of the support bar. The brackets each have a first side wall affixed to the support bar, a second side wall extending substantially parallel to the first sidewall, an end wall extending between the side walls and an open side, opening between the first and second side walls. The open sides of the first and second brackets open in opposing directions to receive a rigid elongate member between the parallel side walls of the brackets from opposite directions. A securing pin extending though at least one of the second side walls secures the rigid elongate member in at least one of the brackets.

In one aspect a seat support frame includes a first support member extending substantially parallel to the elongate support bar, a second support member affixed to the first support member at a proximal end thereof that extends substantially perpendicular to the first elongate member. A hinge pivotally connects the first elongate support member to the elongate support bar. A seat is mounted on the second support member adjacent distal end of the second support member such that the seat traverses an arc around the hinge when the first support member pivots around the hinge. A retaining arm is affixed to and extends from the elongate support bar adjacent the first bracket. When the second support member pivots around the hinge, the second support member passes adjacent to the retaining arm which includes a plurality of alignment apertures formed along the length of the arm. The second support member has at least one mating aperture formed therethough that sequentially aligns with a plurality of the first apertures as the second support member pivots around the hinge. A locking pin extends through the mating aperture and a selected one of the alignment apertures to secure the second support member and the seat in a selected pivotal position.

BRIEF DESCRIPTION OF THE DRAWINGS

For a more complete understanding, reference is now made to the following description taken in conjunction with the accompanying Drawings in which:

FIG. 2B is a partial side view of the detachable seat of FIG. 2A;

DETAILED DESCRIPTION

Figure 1:
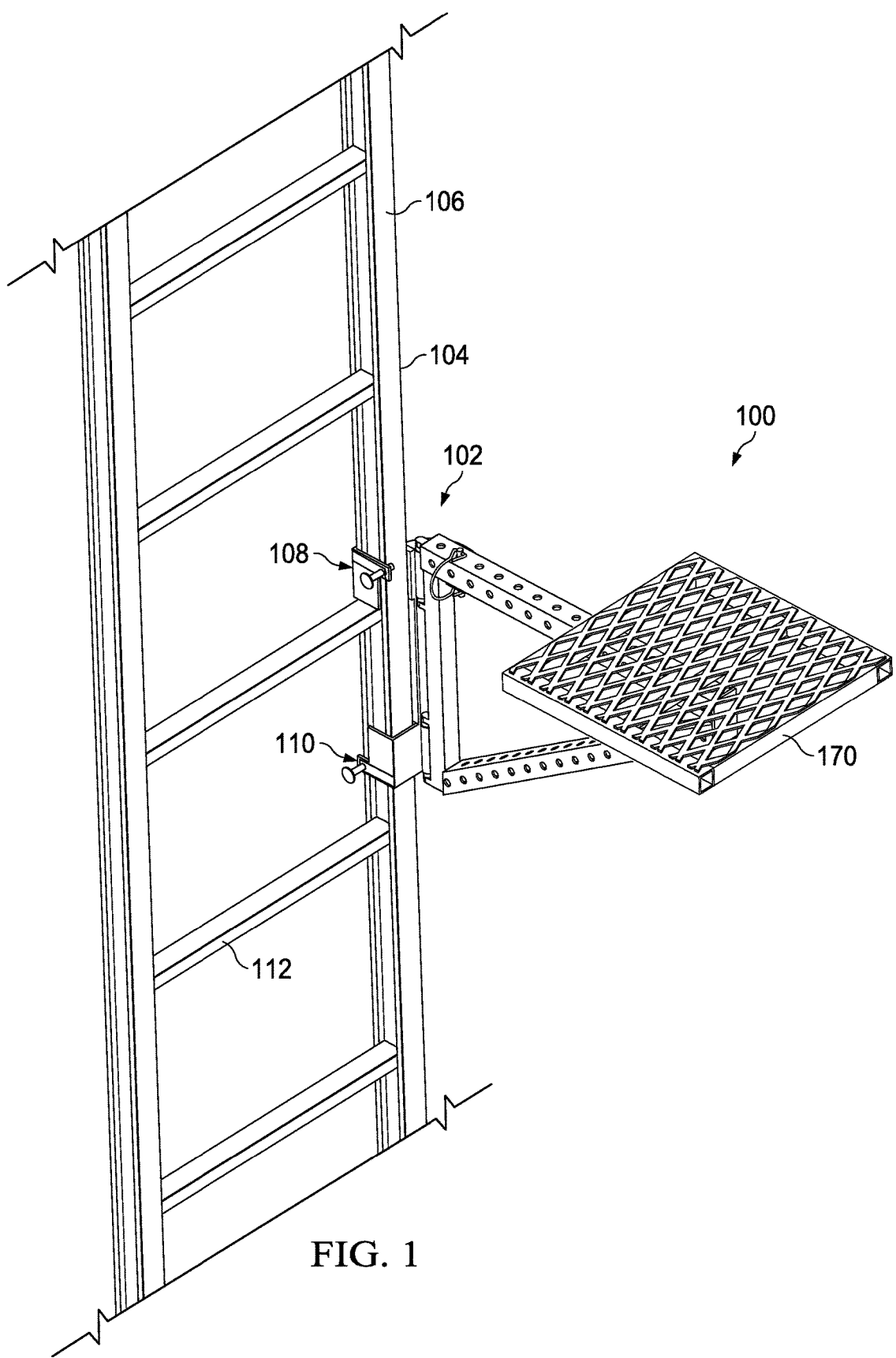
FIG. 1 is a partial perspective view of one embodiment of a detachable swivel seat of the disclosure.

Referring now to the drawings, wherein like reference numbers are used herein to designate like elements throughout, the various views and embodiments of the detachable swivel seat are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a partial perspective view of one embodiment of a detachable swivel seat 100 of the disclosure. Detachable swivel seat 100 includes a mounting assembly 102 configured to secure the seat to a rigid elongate frame member such as a leg 104 of ladder 106. Mounting assembly 102 includes first and second mounting brackets 108 and 110 configured to fit over frame member 104 with first mounting bracket 108 abutting and resting on a step 112 of ladder 106 to support the seat in position on the ladder.

Figure 2A:
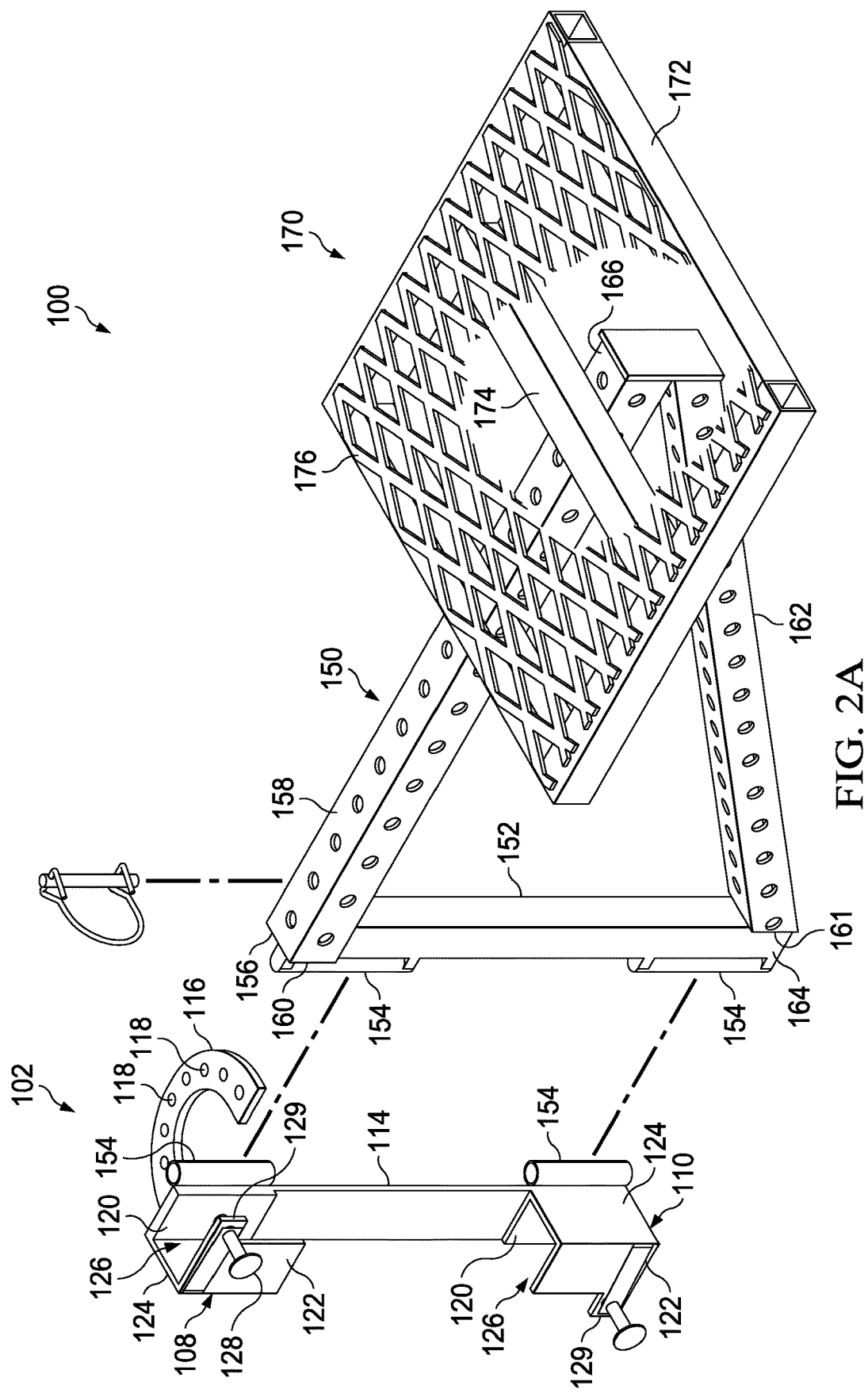
FIG. 2A is a partial exploded view of the detachable seat 100 of FIG. 1.

FIG. 2A is a partial exploded view of the detachable seat 100 of FIG. 1. Referring now to FIGS. 1 and 2A, mounting assembly 102 includes an elongate support bar 114 extending generally parallel to leg 104 of ladder 106. A retaining arm 116 affixed to and extending from elongate support bar 114 adjacent the first mounting bracket 108 includes a plurality of alignment apertures 118 at spaced apart intervals along the arm. In one embodiment, support bar 114 and retaining arm 116 are formed from a section of steel flat; however, in different embodiments, other materials such as other metals and suitable plastics as well as other geometries may be employed.

As best illustrated in FIG. 2A, mounting brackets 108 and 110 are each generally rectangular with first and second parallel side walls 120, 122, an end wall 124 and an open side 126 opening between sidewalls 120, 122. Mounting brackets 108 and 110 are affixed by welding or other suitable means to elongate support bar 114 with the open sides 126 of the brackets facing in opposing directions to receive a rigid elongate frame member such as leg 104 of ladder 106 between side walls 120, 122 of the brackets as illustrated in FIG. 1. This may be accomplished by positioning brackets 108, 110 on opposite sides of leg 104 with the open sides 126 of the brackets aligned with the leg and rotating elongate support bar 114 such that leg 104 is received in each of the brackets between sidewalls 120, 122 of the brackets.

As illustrated, when detachable swivel seat 100 is deployed on ladder 106, bracket 108 is positioned immediately above step 112 of the ladder, abutting and resting on the step to support the seat in position on the ladder. In one embodiment, each of brackets 108, 110 includes securing pins 128 (one shown) extending though at least second side walls 122. As shown, each of second sidewalls 122 has a tab 129 configured to extend past a rigid elongate frame member such as a leg 104 of ladder 106 when the bracket is fitted over the leg. As illustrated, securing pins 128 extend through tabs 129 of brackets 108, 110 to secure leg 104 of ladder 106 in the bracket. In other embodiments, securing pins 128 may extend though both tab 129 and first sidewall 120.

To move detachable seat 100 to different locations on ladder 106 (FIG. 1), securing pins 128 are retracted so that the brackets may be disengaged from leg 104 of the ladder. Elongate support bar 114 is rotated or turned to disengage brackets 108, 110 from leg 104 of ladder 106 allowing detachable seat 100 to be removed from ladder 106. Detachable seat 100 is then moved to the desired location, preferably corresponding to a step 122 of the ladder, and brackets 108, 110 placed over leg 104 of ladder 106. Securing pins 128 are extended to secure brackets 108, 110 and seat 100 in the desired location on ladder 106. While detachable seat 100 is illustrated in use with ladder 106, it will be appreciated that the seat may be used on or with a variety of different structures having a rigid member that can be engaged with brackets 108, 110.

FIG. 2B is a partial side view of the detachable seat of FIG. 2A. Referring to FIG. 2A and FIG. 2B, a seat support frame 150 includes a first support member 152 extending substantially parallel to elongate support bar 114. First support member 152 is connected to elongate support bar 114 by means of one or more hinges 154. Hinges 154 permit support frame 150 to pivot around an axis through the hinge extending parallel to elongate support bar 114. A proximal end 156 of a radially extending second support member 158 is affixed to first support member 152 at an upper or first end 160 of the first support member. A proximal end 161 of a third or bracing member 162 is affixed to lower or second end 164 of first support member 152. Bracing member 162 extends diagonally from the lower or second end 164 of first support member 152 to a connecting plate 163 at the distal end 166 the second support member 158. A distal end 165 of bracing member 162 and the distal end 166 of second support member 158 are affixed to connecting plate 163. In one embodiment, support members 152, 158 and 162 may be formed from steel tubing and connected by welding, bolting or other suitable attachment means; however, in various embodiments, the support members may be formed from different materials having the same or different geometries.

Referring still to FIG. 2A, in one embodiment, a seat 170 includes a generally rectangular seat frame 172 having a cross-member 174 affixed to second support member 158. In one embodiment, cross-member 174 is rigidly secured to second support member 158 for example by welding, in another, a swivel (not shown) is used to attach cross-member 174 to second support member 158 thereby enabling seat 170 to swivel independent of support frame 150. In different embodiments, cross-member 174 may be omitted and seat frame 172 affixed directly to second support member 158. In one embodiment, rectangular seat frame 172 and cross-member 174 may be formed from steel tubing, however different materials and geometries, for example a suitable plastic round, oval or rectangular tube or channel.

In the illustrated embodiment, an expanded metal cover 176 is affixed over rectangular seat frame 172 to provide a surface for sitting. Expanded metal cover 176 extends to the perimeter of the rectangular seat frame 172 and may be affixed to the frame by welding or other suitable fastening means. In different variations rectangular seat frame 172 may have a different geometry such as circular, oval or other suitable configuration. In different variations, a cushion or cushioned cover may be attached over expanded metal cover 176 for comfort or a suitable cushioned seat may be substituted for the expanded metal cover.

Figure 2C:
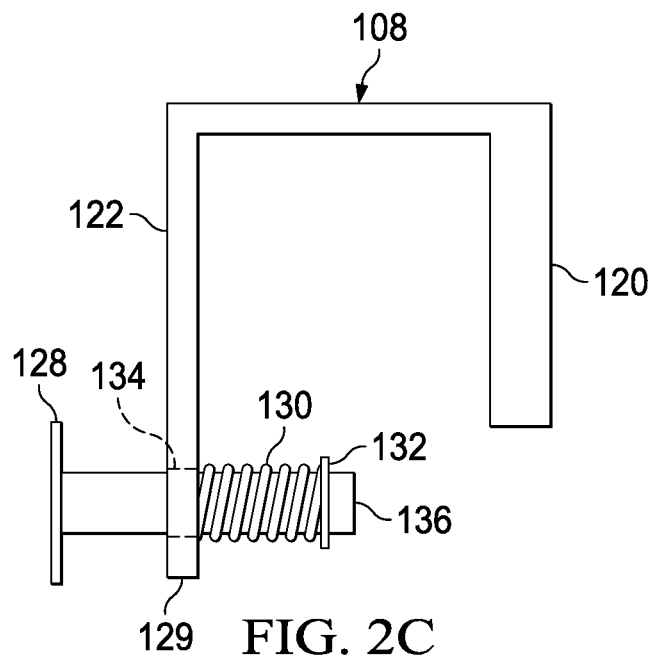
FIG. 2C is a partial cutaway view of one embodiment of a bracket for use with the detachable swivel seat of FIG. 1.
Figure 2D:
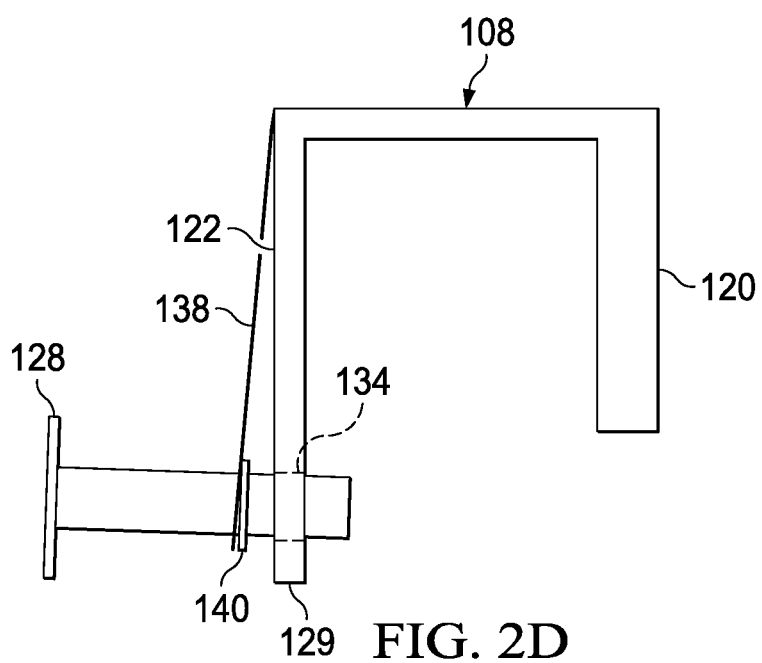
FIG. 2D is a partial cutaway view of a second embodiment of a bracket for use with the detachable swivel seat of FIG. 1.

Turning to FIG. 2C, this is a partial cutaway view of one embodiment of a bracket 108. As illustrated, securing pins 128 may be spring-loaded with a coil spring 130 and a spring keeper such as snap ring 132 to hold the pins in position in pin holes 134. The ends 136 of pins 128 may be beveled as shown to facilitate placing the brackets over a rigid elongate frame member such as a leg 104 of ladder 106. Referring to FIG. 2D, in a different embodiment, securing pins 128 may be spring-loaded with a flat spring 138, welded, bolted or otherwise fastened to second sidewall 122 of brackets 108, 110. As shown, spring 138 may be welded to pin 128 or otherwise coupled to securing pin 128, for example with a snap ring 140, to bias the pin into pin hole 134.

Figure 3A:
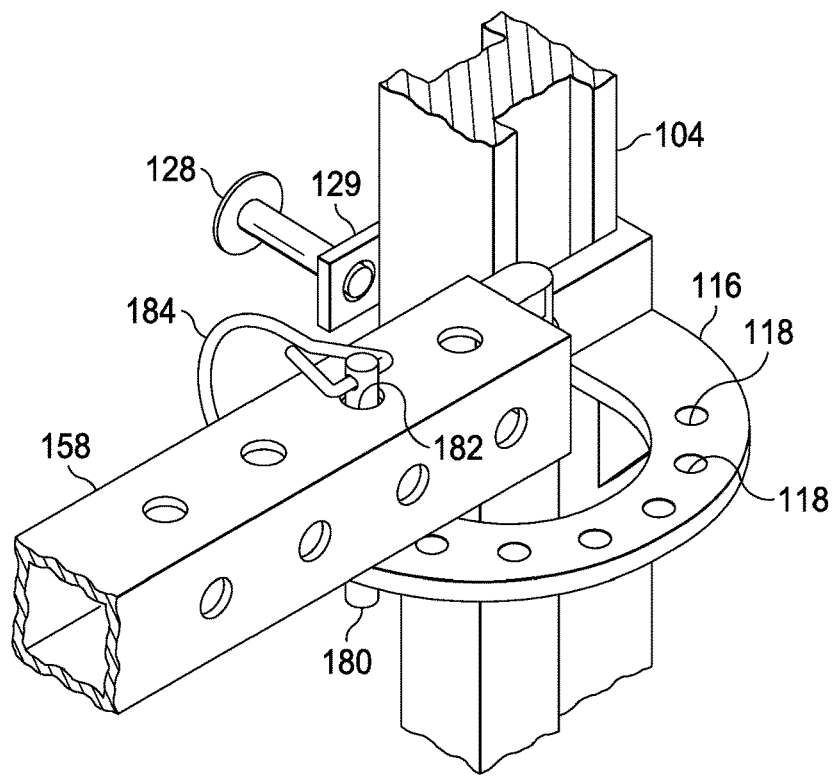
FIG. 3A is partial perspective view of the detachable swivel seat of FIG. 1 with a securing pin disengaged.
Figure 3B:
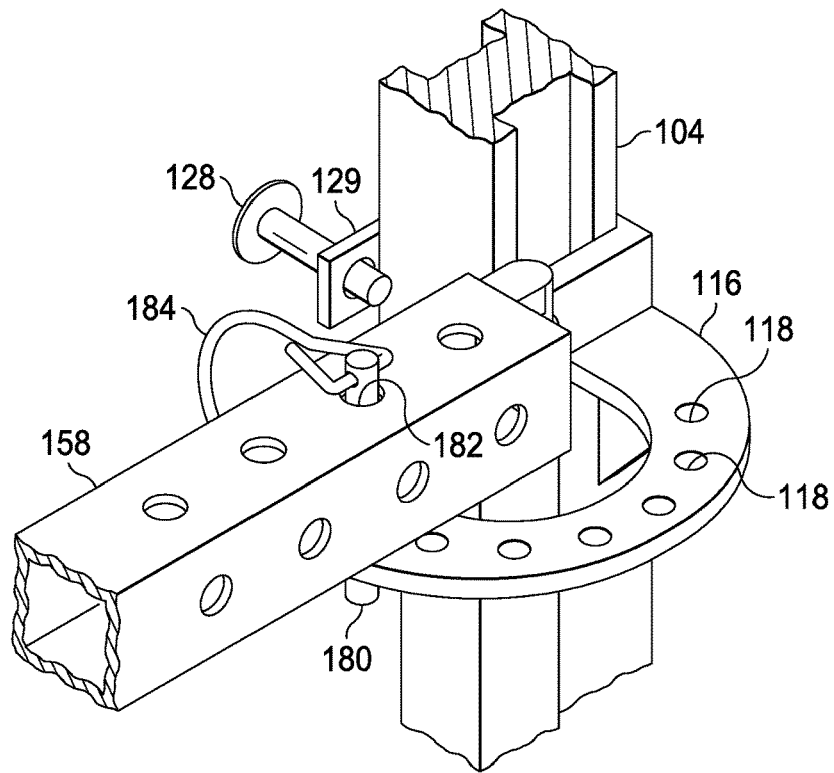
FIG. 3B is partial perspective view of the detachable swivel seat of FIG. 1 with a securing pin engaged.

FIGS. 3A and 3B are partial perspective views of detachable seat 100 further illustrating portions of mounting assembly 102 and seat support frame 150. In FIG. 3A, securing pin 128 is shown in a retracted position. In FIG. 3B, securing pin 128 is extended, securing first mounting bracket 108 to leg 104 of ladder 106. A locking pin 180 extends through a mating aperture 182 in second support member 158 and through one of the plurality of alignment apertures 118 in retaining arm 116. Locking pin 180 is provided with a keeper, such as D clip 184, to secure locking pin 180 in position.

Figure 4A:
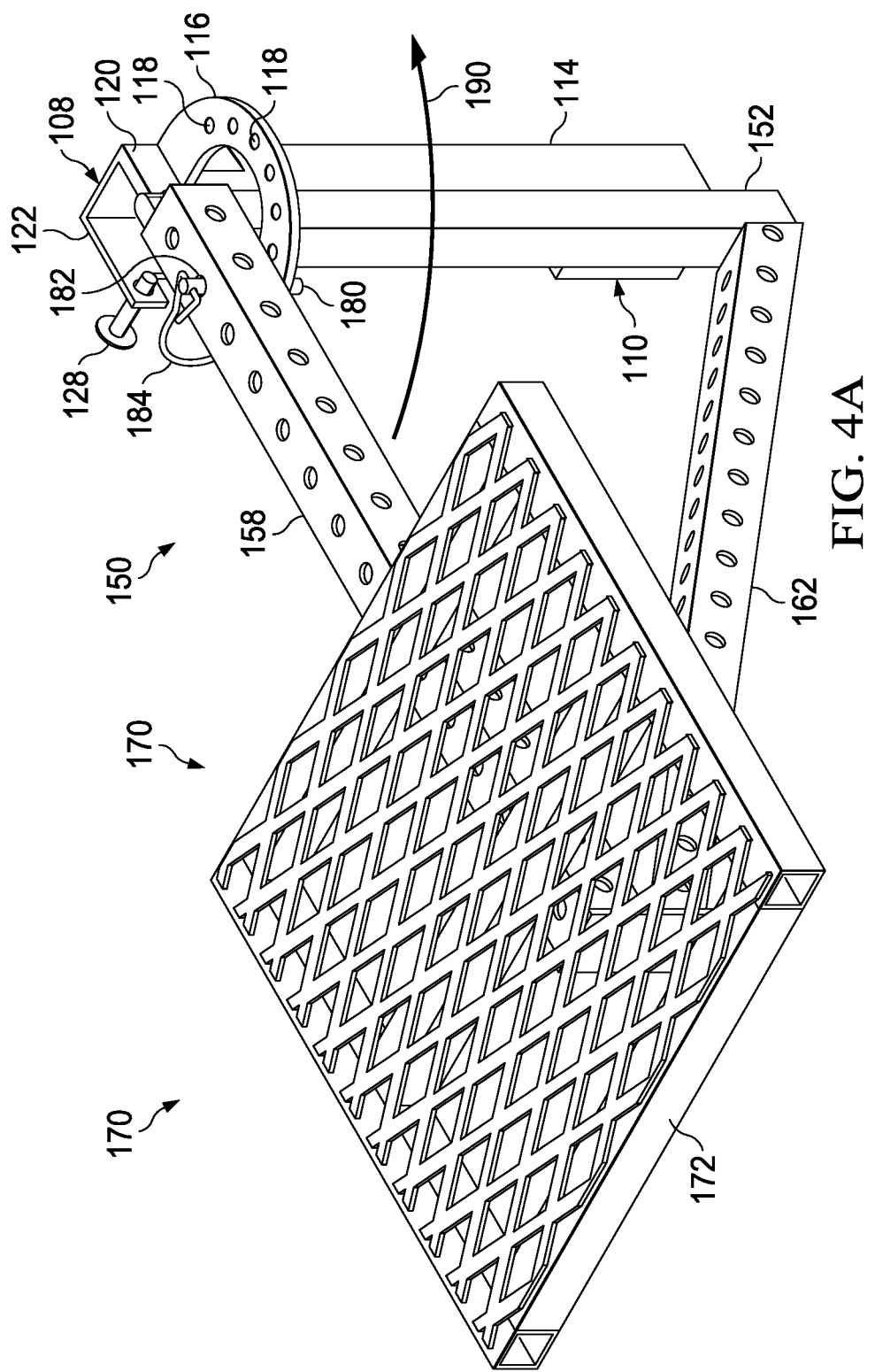
FIG. 4A is a partial perspective view of the detachable swivel seat of FIG. 1 in a first pivot position.
Figure 4B:
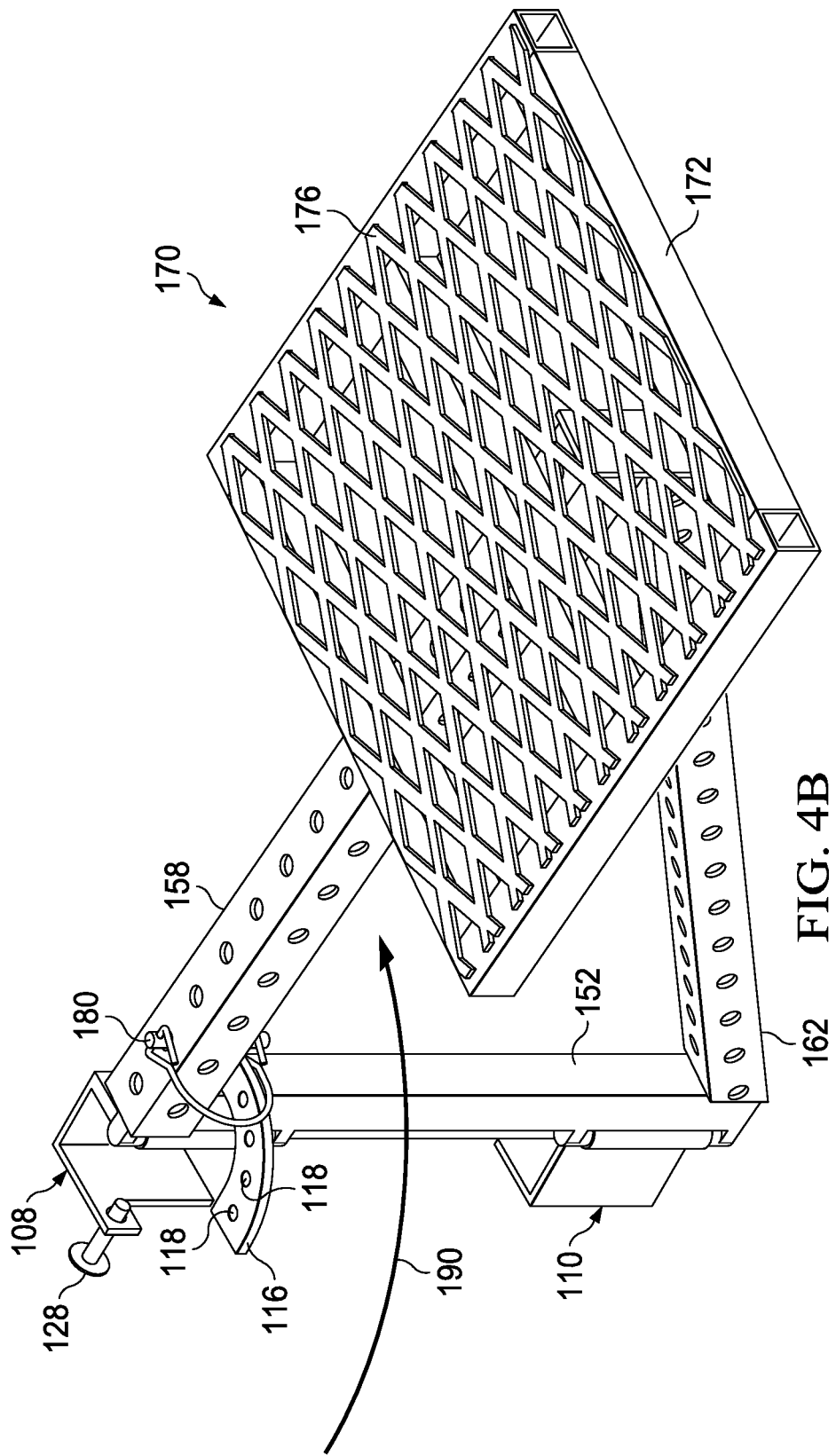
FIG. 4B is a partial perspective view of the detachable swivel seat of FIG. 1 in a second pivot position.

FIG. 4A is a partial perspective view of detachable swivel seat 100 of FIG. 1 in a first pivot position. As illustrated, in the first pivot position, first support member 158 extends substantially parallel to parallel side walls 120, 122 of mounting brackets 108, 110 and substantially perpendicular to step 112 of ladder 106 as shown in FIG. 1. FIG. 4B is a partial perspective view of detachable swivel seat 100 of FIG. 1 in a second pivot position wherein first support member 158 extends substantially perpendicular to parallel side walls 120, 122 of mounting brackets 108, 110. In the second pivot position, support member 158, extends substantially parallel to step 112 of ladder 106.

Detachable swivel seat 100 may be moved between different pivotal positions, for example, from the position illustrated in FIG. 4A to the position of FIG. 4B by disengaging keeper 184 and removing locking pin 180 from mating aperture 182 and alignment aperture 118 and swiveling or pivoting support frame 150 in the direction indicated by arrow 190. As support frame 150 pivots, second support member 158 sequentially passes a series of alignment apertures 118 formed in retaining arm 116 with second support member 158 and seat 170 traveling through an arc around hinge 154 as indicated by arrow 190. As second support member 158 pivots, mating aperture 182 sequentially aligns with alignment apertures 118. When detachable swivel seat 100 is in the desired pivotal position corresponding to one of alignment apertures 118, locking pin 180 is inserted into mating aperture 182 and alignment aperture 118 and keeper 184 engaged, securing swivel seat 100 in the desired pivotal position. In this manner a user can position seat 170 in a plurality of different pivotal positions, each corresponding to an alignment aperture 118.

Figure 5A:
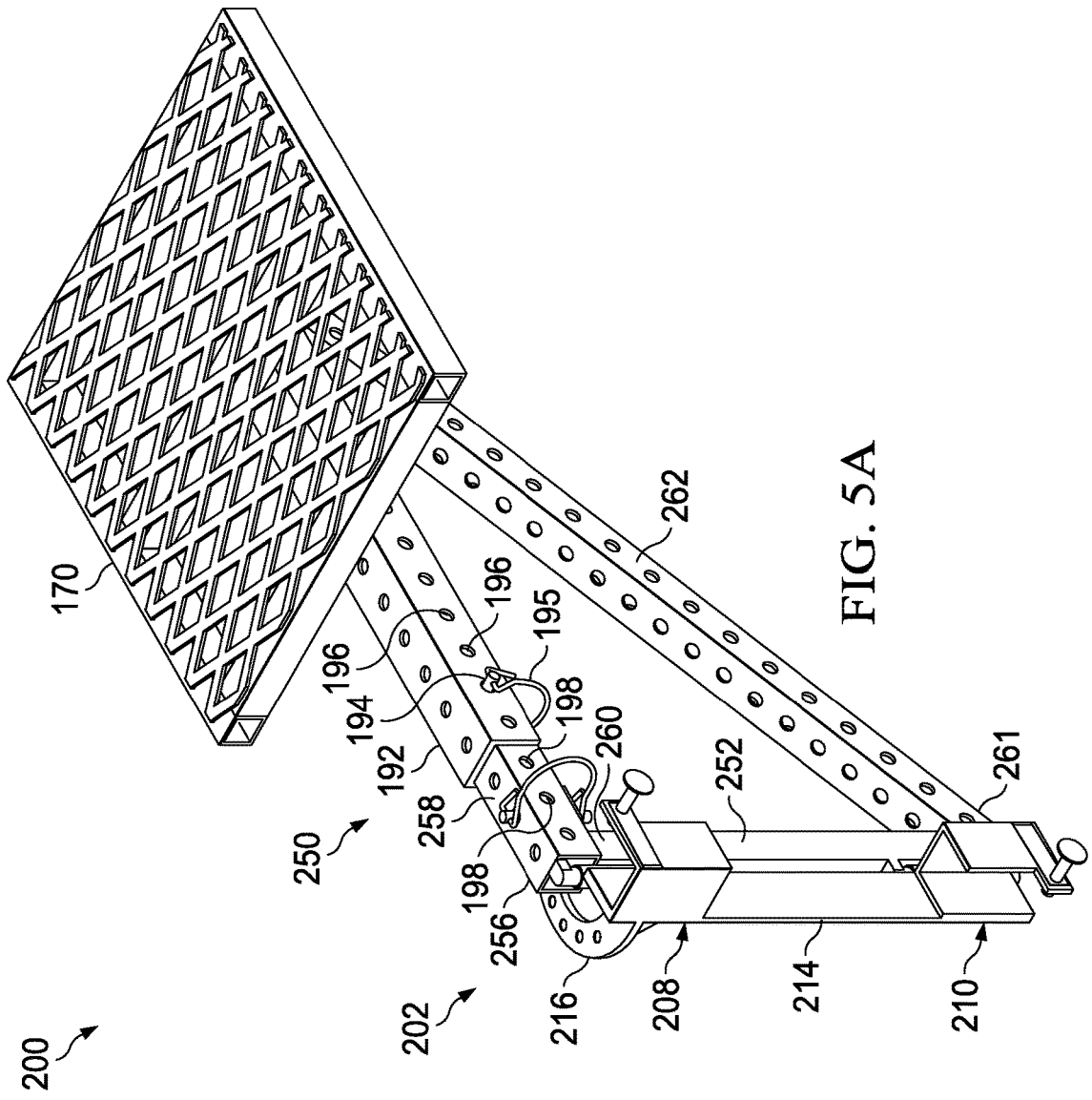
FIG. 5A is a partial perspective view of an extendable detachable swivel seat of the disclosure.
Figure 5B:
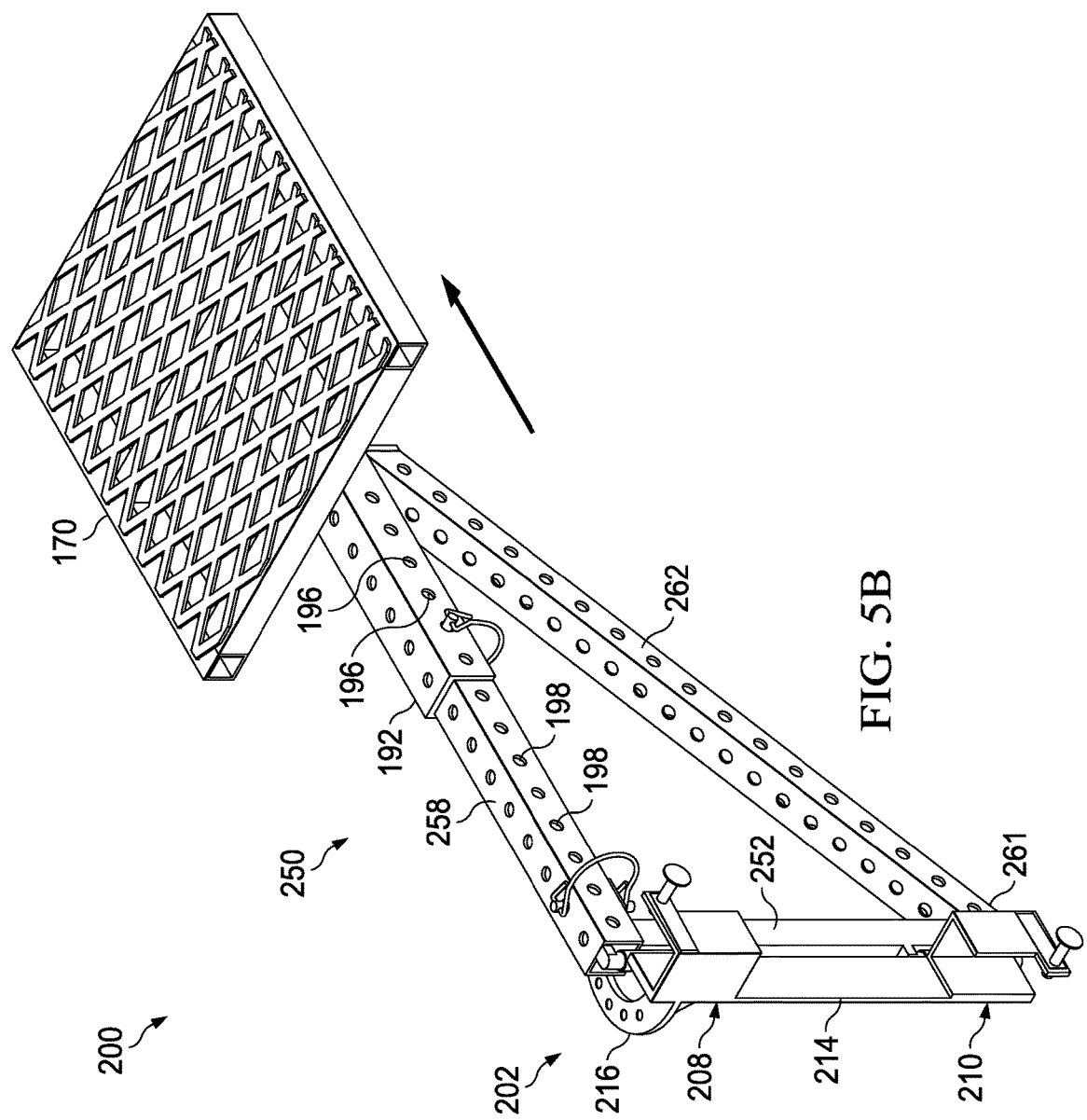
FIG. 5B is a partial perspective view of an extendable detachable swivel seat of FIG. 5A in an extended position.

FIG. 5A is a partial perspective view of an extendable detachable swivel seat 200. FIG. 5B is a partial perspective view of the extendable detachable swivel seat of FIG. 5A in an extended position. Extendable detachable swivel seat 200 includes a mounting assembly 202, identical or substantially similar to mounting assembly 102 of FIGS. 1 and 2A, including an elongate support bar 214, first and second mounting brackets 208 and 210 and retaining arm 216.

Swivel seat 200 includes a seat support frame 250 having a first support member 252 connected to elongate support bar 214 by means of one or more hinges (not shown) enabling support frame 250 to pivot around an axis through the hinge extending parallel to elongate support bar 214 in the same manner as support frame 150 of FIGS. 4A and 4B. As illustrated, first support member 252 extends substantially parallel to elongate support bar 214. A proximal end 256 of a radially extending second support member 258 is affixed to the first support member at an upper or first end 260 of the first support member. A proximal end 261 of a third or bracing member 262 is affixed to lower or second end of first support member 252 with the bracing member extending diagonally to a connecting plate (not shown) where a distal end of the second support member is also attached.

As illustrated, an extender 192 is positioned on second support member 258 to enable a user to radially extend seat 170. In one embodiment, extender 192 is formed from a C-shaped steel channel sized to fit over second support member 258. Extender 192 is secured to the second support member with an extension pin 194 that fits through selected ones of a plurality of mating extender holes 196, 198 formed in extender 192 and second support member 258, respectively. A pin keeper 195 is provided to secure extension pin 194 in position in mating extender holes 196, 198. Thus, a user can extend and retract seat 170 radially from mounting assembly 202 to positions corresponding to alignment of extender holes extender holes 196, 198 as extender 192 is moved along second support member 258.

Referring again to FIG. 2A, in one embodiment, detachable swivel seat 100 may be used with or without extender 192. In this embodiment, seat 170 of detachable swivel seat 100 is configured to be removable from second support member 158, for example by attaching the seat to the second support member with bolts or screws. In this variation, extender 192 is dimensioned to fit over second support member 158 with seat 170 attached to the extender. After removing seat 170 from second support member extender 192 is fitted over second support member 158 and secured in a selected position with extension pin 194. Seat 170 may be attached to extender before or after extender 192 is secured to second support member 158.

It will be appreciated by those skilled in the art having the benefit of this disclosure that this detachable swivel seat provides a seat suitable for use on an elevated structure that is portable, easily mounted and moved that allows a user to pivot. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A detachable seat, comprising:
   an elongate support bar having first and second brackets positioned adjacent opposing ends of the support bar, the brackets each having an open side, the open sides of the first and second brackets opening in opposing directions to receive a rigid elongate member in the brackets from opposite directions and a securing pin, securing the rigid elongate member in at least one of the brackets;
   a seat support frame including a first support member extending substantially parallel to the elongate support bar, a second support member affixed to the first support member and extending substantially perpendicular to the first elongate member;
   a hinge pivotally connecting the first elongate support member to the elongate support bar;
   a seat mounted on the second support member, the seat support frame and seat pivoting around the elongate support member upon pivotal movement of the first support member; and
   a retaining arm affixed to and extending from the elongate support bar adjacent the first bracket, the retaining arm having a plurality of alignment apertures formed along the length thereof, the second support member having at least one mating aperture formed therethough, the at least one mating aperture sequentially aligning with a plurality of the alignment apertures upon pivotal movement of the second support member around the hinge to receive a locking pin extending through the at least one mating aperture and a selected one of the alignment apertures to secure the second support member and the seat in a selected pivotal position.

2. The detachable seat of claim 1 wherein each of the brackets each includes a first side wall affixed to the support bar, a second side wall extending substantially parallel to the first sidewall, an end wall extending between the side walls and an open side, opening between the first and second side walls, the open sides of the first and second brackets opening in opposing directions to receive an rigid elongate member between the parallel side walls of the brackets from opposite directions.

3. The detachable seat of claim 1 further comprising:
   a seat support frame including a first support member extending substantially parallel to the elongate support bar, a second support member affixed to the first support member and extending substantially perpendicular to the first elongate member and a bracing member extending from a lower end of the first support member to a distal end of the second support member.

4. The detachable seat of claim 1 wherein the seat further comprises:
   a tubular steel frame including a cross member affixed to the second support member; and,
   an expanded metal seating surface affixed to the tubular steel frame.

5. The detachable seat of claim 1 wherein the first and second support members are tubular steel.

6. The detachable seat of claim 1 wherein the seat further comprises:
   a tubular steel frame including a cross member affixed to the second support member.

7. A detachable seat, comprising:
   an elongate support bar having first and second generally rectangular brackets positioned adjacent opposing ends of the support bar, the brackets each having a first side wall affixed to the support bar, a second side wall extending substantially parallel to the first sidewall, an end wall extending between the side walls and an open side, opening between the first and second side walls, the open sides of the first and second brackets opening in opposing directions to receive an rigid elongate member between the parallel side walls of the brackets from opposite directions and a securing pin extending though at least one of the second side walls to secure the rigid elongate member in the bracket;

a seat support frame including a first support member extending substantially parallel to the elongate support bar, a second support member affixed to the first support member at a proximal end thereof and extending substantially perpendicular to the first elongate member;

a hinge pivotally connecting the first elongate support member to the elongate support bar;

a seat mounted on the second support member adjacent distal end of the second support member, the seat traversing an arc around the hinge upon pivotal movement of the first support member around the hinge; and a retaining arm affixed to and extending from the elongate support bar adjacent the first bracket, the second support member passing adjacent to the retaining arm upon pivotal movement of the second support member around the hinge, the retaining arm having a plurality of alignment apertures formed along the length thereof, the second support member having at least one mating aperture formed therethough, the at least one mating aperture sequentially aligning with a plurality of the first apertures upon pivotal movement of the second support member around the hinge to receive a locking pin extending through the at least one mating aperture and a selected one of the alignment apertures to secure the second support member and the seat in a selected pivotal position.

8. The detachable seat of claim 1 further comprising a keeper for securing the retaining pin in the at least one mating aperture and the selected one of the first apertures to secure the second support member and the seat in a selected pivotal position.

9. The detachable seat of claim 7 wherein the first and second support members are tubular steel.

10. The detachable seat of claim 7 wherein the seat further comprises:

a tubular steel frame including a cross member affixed to the second support member.

11. The detachable seat of claim 10 wherein the seat further comprises an expanded metal seating surface affixed to the tubular steel frame.

12. The detachable seat of claim 7 further comprising:

an extender, the extender configured for sliding engagement along the length of the second support member, wherein the seat is mounted on the extender so that that the seat is moveable with the extender along the length of the second support member.

13. The detachable seat of claim 12 further comprising:

a plurality of mating extender holes formed in each of the extender and the second support member;

an extension pin extending through aligned mating extender holes in the extender and in the second support member at a selected one of a plurality of locations where mating extender holes in the extender are aligned with mating extender holes in the second support member, the extension pin securing the extender at the selected location.

\* \* \* \* \*